(12) United States Patent
Jeon et al.

(10) Patent No.: US 12,548,866 B2
(45) Date of Patent: Feb. 10, 2026

(54) POUCH-TYPE FLEXIBLE BATTERY

(71) Applicant: SAMSUNG ELECTRONICS CO., LTD., Suwon-si (KR)

(72) Inventors: Yongsub Jeon, Suwon-si (KR); Yongjun Shin, Suwon-si (KR); Kiyoun Jang, Suwon-si (KR); Chihyun Cho, Suwon-si (KR); Jaeman Choi, Suwon-si (KR); Jooyil Pyun, Suwon-si (KR); Changryong Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 532 days.

(21) Appl. No.: 18/192,414

(22) Filed: Mar. 29, 2023

(65) Prior Publication Data

US 2023/0238670 A1    Jul. 27, 2023

Related U.S. Application Data

(63) Continuation of application No. PCT/KR2021/018988, filed on Dec. 14, 2021.

(30) Foreign Application Priority Data

Dec. 15, 2020   (KR) .................. 10-2020-0175774

(51) Int. Cl.
*H01M 50/569* (2021.01)
*H01M 50/105* (2021.01)
*H01M 50/519* (2021.01)

(52) U.S. Cl.
CPC ....... *H01M 50/569* (2021.01); *H01M 50/105* (2021.01); *H01M 50/519* (2021.01)

(58) Field of Classification Search
CPC .................................................. H01M 50/519
See application file for complete search history.

(56) References Cited

U.S. PATENT DOCUMENTS

| 7,059,769 B1 | 6/2006 | Potega |
| 8,929,085 B2 | 1/2015 | Franklin et al. |
(Continued)

FOREIGN PATENT DOCUMENTS

| JP | 3896911 B2 | 1/2007 |
| JP | 2008192432 A | 8/2008 |
(Continued)

OTHER PUBLICATIONS

International Search Report for PCT/KR2021/018988 mailed Apr. 6, 2022, 7 pages.
(Continued)

*Primary Examiner* — Brian R Ohara
(74) *Attorney, Agent, or Firm* — Nixon & Vanderhye, P.C.

(57) ABSTRACT

An electronic device according to an embodiment of the disclosure may include a battery. The battery may include: an electrode assembly including a cathode substrate coupled to a cathode tab, an anode substrate coupled to an anode tab, and a separator sheet disposed between the cathode substrate and the anode substrate, and a pouch accommodating the electrode assembly, wherein the pouch includes a bonding portion provided along an edge of the electrode assembly, a first damage detection circuit configured to detect damage to the battery, and a circuit board to which the cathode tab, the anode tab, and the first damage detection circuit are electrically coupled. The battery may include a first portion, a second portion foldable with respect to the first portion, and a folding portion which couples the first portion and the second portion. The first damage detection circuit may extend from a first point of the circuit board to a single point (Continued)

of the second portion by crossing the first portion and the folding portion along an inside of the bonding portion, and extend from the single point of the second portion to a second point of the circuit board by crossing the folding portion and the first portion along the inside of the bonding portion.

20 Claims, 12 Drawing Sheets

(56) References Cited

U.S. PATENT DOCUMENTS

| | | |
|---|---|---|
| 9,219,288 B2 | 12/2015 | Ahn |
| 10,446,886 B2 | 10/2019 | Raghavan et al. |
| 10,586,955 B2 | 3/2020 | Takahashi et al. |
| 10,608,290 B2 | 3/2020 | Yamakaji et al. |
| 2016/0156071 A1* | 6/2016 | Yamakaji ............ H01M 50/121 429/61 |
| 2019/0363314 A1 | 11/2019 | Seo et al. |
| 2020/0194845 A1 | 6/2020 | Yamakaji et al. |

FOREIGN PATENT DOCUMENTS

| | | |
|---|---|---|
| JP | 2008251437 A | 10/2008 |
| JP | 2011142083 A | 7/2011 |
| JP | 6618338 B2 | 11/2019 |
| JP | 6810510 B2 | 12/2020 |
| KR | 101245282 B1 | 3/2013 |
| KR | 20140069302 A | 6/2014 |
| KR | 20160063992 A | 6/2016 |
| KR | 20160080559 A | 7/2016 |

OTHER PUBLICATIONS

Written Opinion of the ISA for PCT/KR2021/018988 mailed Apr. 6, 2022, 4 pages.

* cited by examiner

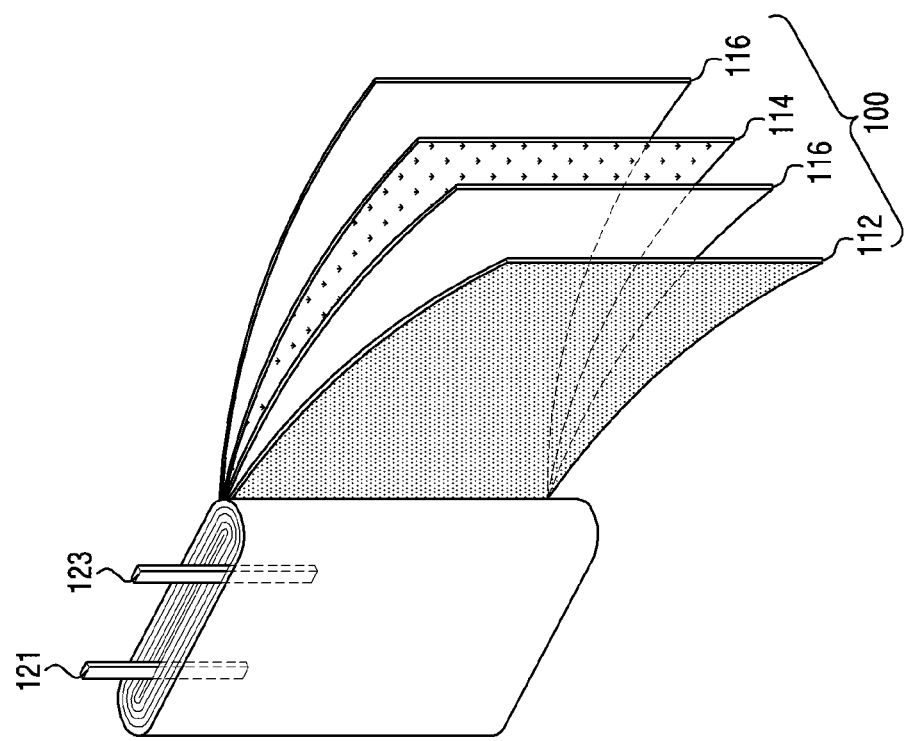
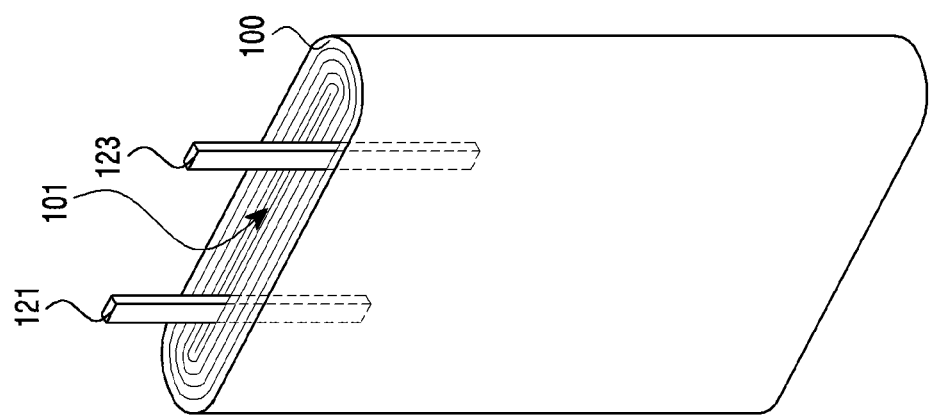
FIG.1B
FIG.1A

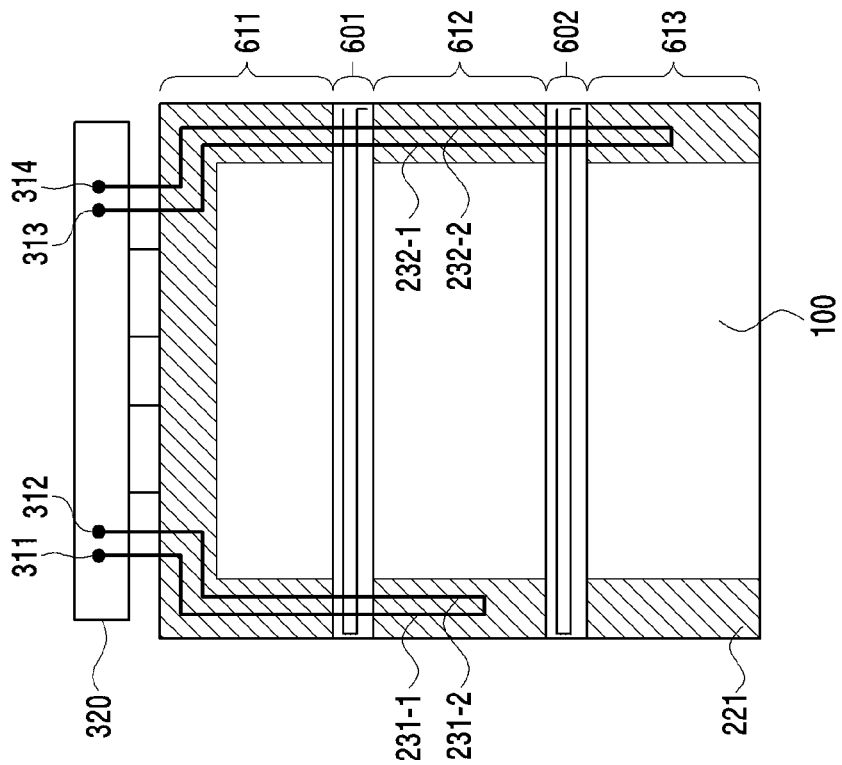
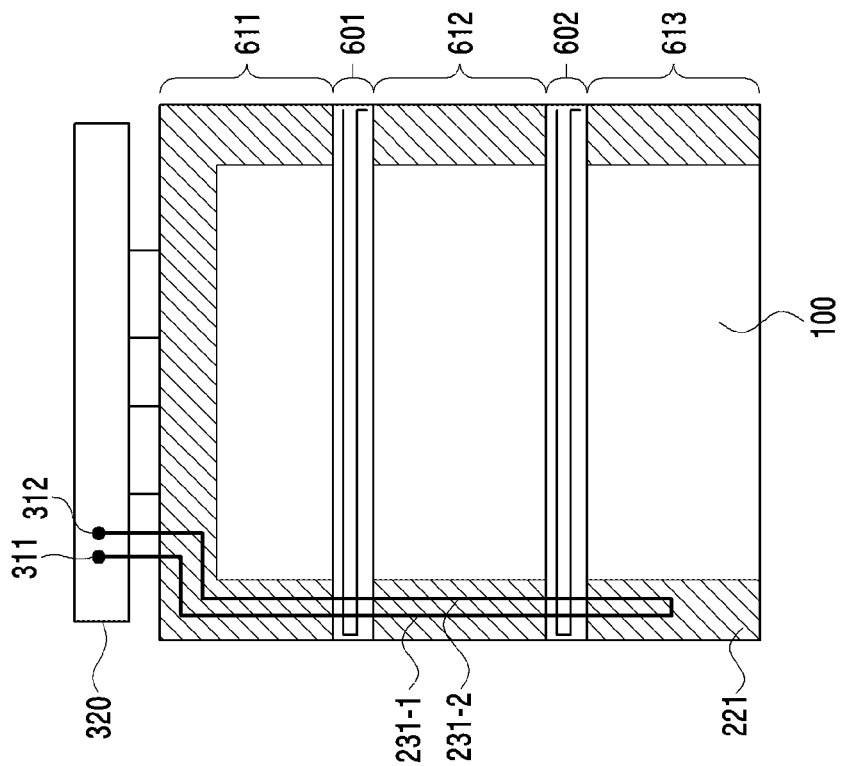

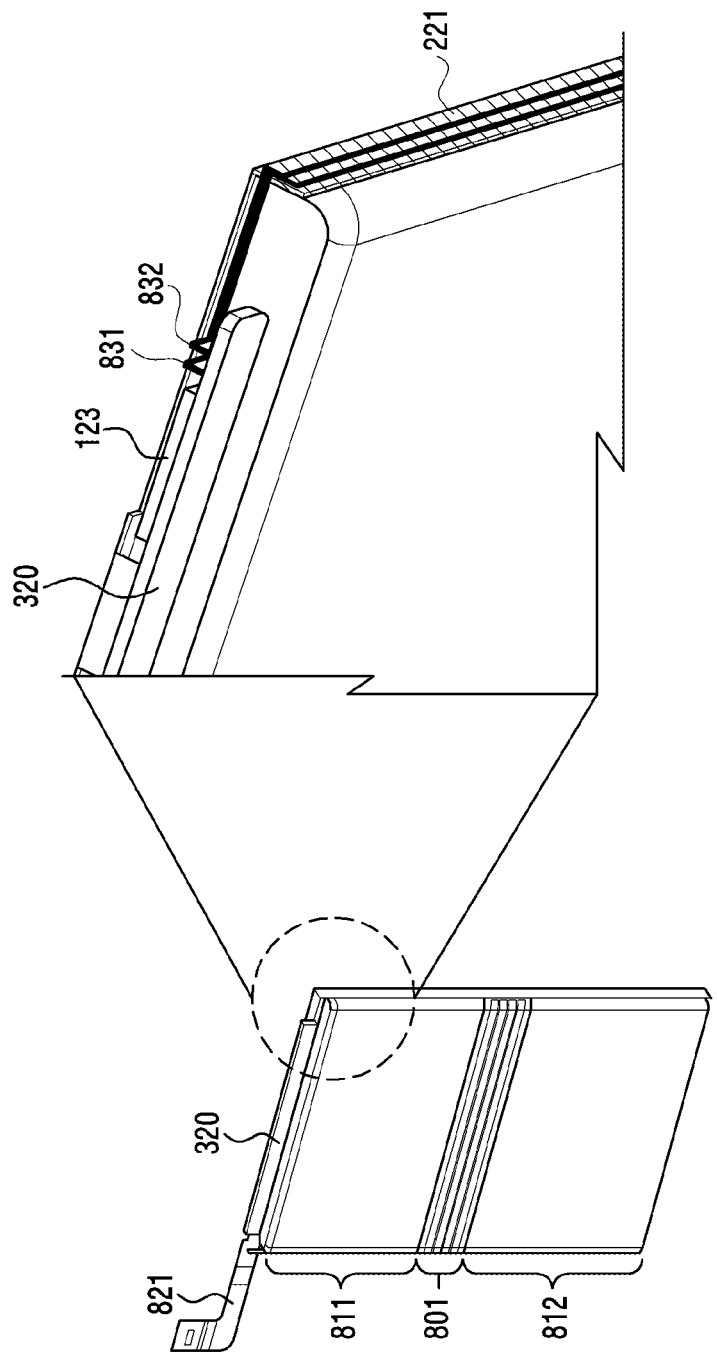

POUCH-TYPE FLEXIBLE BATTERY

CROSS-REFERENCE TO RELATED APPLICATIONS

This application is a continuation of International Application No. PCT/KR2022/018988 designating the United States, filed on Dec. 14, 2021 in the Korean Intellectual Property Receiving Office and claiming priority to Korean Patent Application No. 10-2020-0175774, filed on Dec. 15, 2020, in the Korean Intellectual Property Office, the disclosures of which are incorporated by reference herein in their entireties.

BACKGROUND

Field

The disclosure relates to a pouch-type flexible battery, and to a structure of a damage detection circuit for detecting damage to the pouch-type flexible battery.

Description of Related Art

When a battery is embedded in a foldable electronic device (e.g., a foldable smartphone), the battery requires flexibility depending on a shape or operation of the foldable electronic device. Therefore, a flexible battery having flexibility is under development. Due to a repeated folding operation of an electronic device, a folding portion of the flexible battery having the flexibility may be damaged. Accordingly, there is a need for technologies capable of detecting damage to the folding portion of the flexible battery.

The repeated folding operation of the electronic device may lead to accumulation of damage to a pouch which is a case of the flexible battery, thereby causing damage to a sealing structure (or a bonding portion) of the pouch. Accordingly, a flexible wiring which is more susceptible to deformation than the pouch of the flexible battery may be attached to an outer face of the pouch. As a result, when the wiring is damaged before the pouch is damaged, the electronic device may sense this to detect damage to the pouch.

When a wiring for detecting damage to a pouch is attached to an outer face of the pouch which surrounds an electrode assembly, a circuit for detecting damage to the wiring and pouch may cause an increase in size of a battery, which may result in a decrease in capacity of the battery that can be disposed in the same volume.

It may be difficult to select a material for the wiring which is possibly damaged first before a sealing structure of the pouch is damaged (or released) due to repeated folding of the battery.

When the repeated folding of the battery results in damage to the sealing structure of the battery in a state in which the wiring attached to the outer face of the pouch is not damaged, the electronic device may have difficulty in detecting damage to the sealing structure of the pouch.

SUMMARY

An electronic device according to an example embodiment of the disclosure may include a battery. The battery may include: an electrode assembly including a cathode substrate coupled to a cathode tab, an anode substrate coupled to an anode tab, and a separator sheet (or membrane) disposed between the cathode substrate and the anode substrate, and a pouch accommodating the electrode assembly, wherein the pouch includes a bonding portion provided along an edge of the electrode assembly, a first damage detection circuit configured to detect damage to the battery, and a circuit board to which the cathode tab, the anode tab, and the first damage detection circuit are electrically coupled. The battery may include a first portion, a second portion foldable with respect to the first portion, and a folding portion which couples the first portion and the second portion. The first damage detection circuit may extend from a first point of the circuit board up to a single point of the second portion by crossing the first portion and the folding portion along the inside of the bonding portion, and extend from the single point of the second portion up to a second point of the circuit board by crossing the folding portion and the first portion along the inside of the bonding portion.

According to various example embodiments of the disclosure, it is possible to reduce an increase in size of a battery, caused by a detection circuit and a wiring for detecting damage to a sealing structure of a pouch which surrounds an electrode assembly. Therefore, it is possible to increase capacity of the battery that can be disposed inside the same volume.

When the sealing structure of the pouch is damaged and released, there may be an occasion in which damage is not detected even if the sealing structure of the pouch is damaged since the wiring is disconnected by reacting with electrolyte and air. The disclosure can reduce such an occasion, and can detect damage to the sealing structure of the pouch on a real-time basis.

In addition, various effects which are directly or indirectly understood through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 1A and 1B are diagrams illustrating an example electrode assembly according to various embodiments;

FIGS. 6A and 6B are diagrams illustrating a damage detection circuit included in a flexible battery having two folding portions in a horizontal direction according to various embodiments;

FIGS. 8A and 8B are diagrams illustrating an exterior of a flexible battery according to various embodiments.

With regard to the description of the drawings, similar reference numerals may be used to refer to similar or related elements.

DETAILED DESCRIPTION

Figure 2A:
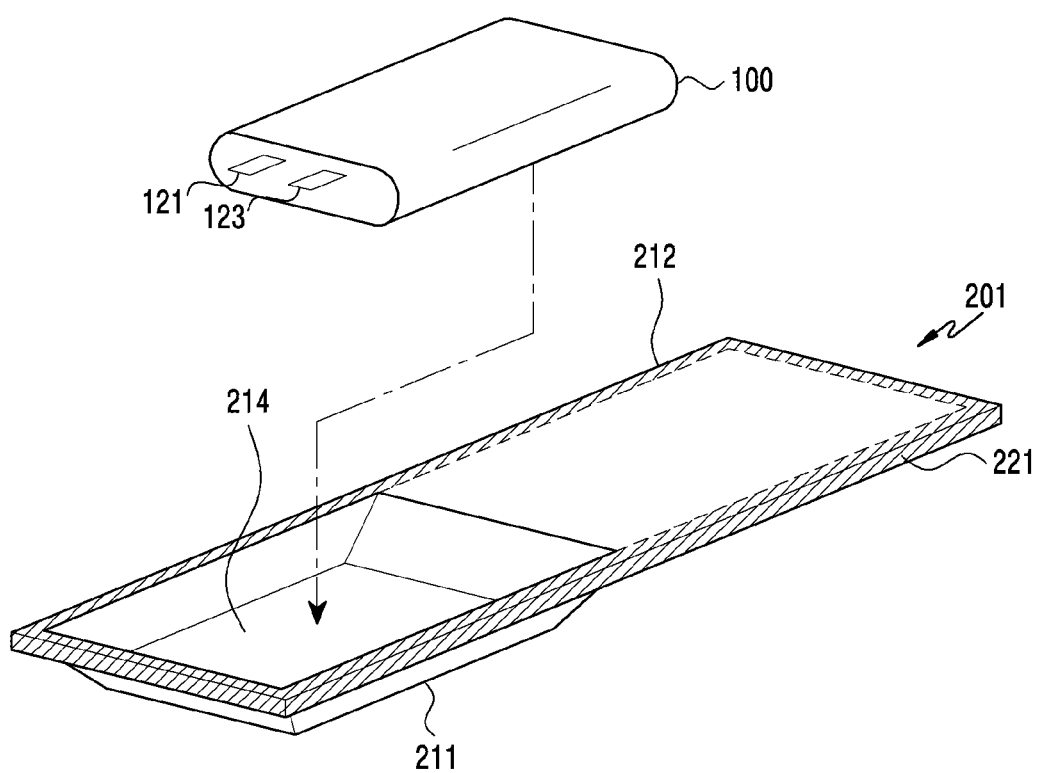
FIG. 2A is a diagram illustrating an electrode assembly and a pouch according to various embodiments.

Hereinafter, various example embodiments of the disclosure are described with reference to the accompanying drawings. However, it should be appreciated that this is not intended to limit the technological features set forth herein to particular embodiments and includes various modifications, equivalents, or alternatives for an embodiment of the disclosure.

FIGS. 1A and 1B are diagrams illustrating an electrode assembly 100 according to various embodiments.

FIG. 1A illustrates the electrode assembly 100 which surrounds a cathode tab 121 and an anode tab 123, and FIG. 1B illustrates components of the electrode assembly 100 according to various embodiments.

Referring to FIGS. 1A and 1B, the electrode assembly 100 may be sequentially wound around the cathode tab 121 and the anode tab 123 with respect to a central region 101. Hereinafter, the electrode assembly 100 of a jelly roll type is described, which is wound with respect to the central region 101 in such a manner that a separator (e.g., a separator sheet or membrane) 116 is disposed between a cathode substrate (or a cathode 112) and an anode substrate (or an anode 114), and the cathode substrate and the anode substrate are alternately stacked. However, the electrode assembly 100 is not limited to the jelly roll type, and a stack type may also be included. Although not shown in FIGS. 1A and 1B, the electronic device 100 of the stack type may be constructed in such a manner that the separator 116 is disposed between the cathode substrate (or the cathode 112) and the anode substrate (or the anode 114), and the cathode substrate and the anode substrate are alternately stacked. Various embodiments of the disclosure may apply to both the electrode assemblies 110 of the jelly roll type and stack type.

According to an embodiment, the cathode 112 may include a cathode substrate, a cathode active material applied to one face of the cathode substrate, and the cathode tab 121 attached to one face of the cathode substrate. The anode 114 may include an anode substrate, an anode active material applied to one face of the anode substrate, and the anode tab 123 attached to one face of the anode substrate. The separator 116 may be disposed between the anode 112 and the cathode 114 or may be disposed between the anode substrate and the cathode substrate.

According to an embodiment, the cathode substrate may be constructed of aluminum, stainless steel, titanium, copper, silver, or a metal material obtained by combining materials selected from these materials. The cathode active material may be applied to the surface of the cathode substrate. For example, the cathode active material may be applied to one face or both faces of the cathode substrate.

According to an embodiment, the cathode active material may be constructed of a material capable of reversibly intercalating and deintercalating lithium. For example, the cathode active material may include at least one material selected from a group consisting of lithium transition metal oxides (e.g., lithium cobalt oxide, lithium nickel oxide, lithium nickel cobalt oxide, lithium nickel cobalt aluminum oxide, lithium nickel cobalt manganese oxide, lithium manganese oxide, and lithium iron phosphate), nickel sulfides, copper sulfides, sulfur, iron oxides, and vanadium oxides.

According to an embodiment, in addition to the cathode active material, a binder (not shown) and a carbon additive (not shown) may be further applied to the surface of the cathode substrate. The carbon additive may refer to fine powdered carbon added in a small amount to improve conductivity between particles of an active material or with respect to a metal current collector in the electrode and prevent and/or reduce the binder from acting as an insulator.

According to an embodiment, the binder may include at least one material selected from a group consisting of polyvinylidene fluoride-containing binders (e.g., polyvinylidene fluoride, vinylidene fluoride/hexafluoropropylene copolymer, vinylidene fluoride/tetrafluoroethylene copolymer, etc.), carboxymethyl cellulose-containing binders (e.g., sodium-carboxymethyl cellulose, lithium-carboxymethyl cellulose, etc.), acrylate-containing binders (e.g., polyacrylic acid, lithium-polyacrylic acid, acrylic, polyacrylonitrile, polymethyl methacrylate, polybutylacrylate, etc.), polyimide-imides, polytetrafluoroethylene, polyethylene oxide, polypyrrole, lithium-Nafion, and styrene butadiene rubber-containing polymers.

According to an embodiment, the carbon additive may include at least one material selected from a group consisting of carbon containing conducting agents (e.g., carbon black, carbon fiber, and graphite), conductive fiber (e.g., metal powder), metal powder (e.g., carbon fluoride powder, zinc oxides, and nickel power), conductive whisker (e.g., zinc oxides and potassium titanate), conductive metal oxides (e.g., titanium oxides), and conductive polymers (e.g., polyphenylene derivatives, etc.).

According to an embodiment, the cathode tab 121 may be attached to one end of the cathode substrate. For example, the cathode tab 121 may be attached to one end of the cathode substrate by ultrasonic welding. One end of the cathode substrate to which the cathode tab 121 is attached may be disposed adjacent to a starting point where the electrode assembly 100 starts to be wound. For example, one end of the cathode substrate to which the cathode tab 121 is attached may be disposed adjacent to the central region 101. A plurality of cathode tabs 121 may be included as the cathode tab 121, and the plurality of cathode tabs 121 may be disposed to be spaced apart from each other in a longitudinal direction of the cathode substrate.

According to an embodiment, the anode substrate may be constructed of at least one metal material selected from a group consisting of copper, stainless steel, nickel, aluminum, and titanium. The anode active material may be applied to the surface of the anode substrate. For example, the anode active material may be applied to one face or both faces of the anode substrate.

According to an embodiment, the anode active material may be constructed of a material capable of forming an alloy together with lithium or capable of reversibly intercalating and deintercalating lithium. For example, the anode active material may include at least one material selected from a group consisting of metals, carbon-containing materials, metal oxides, and lithium metal nitrides.

According to an embodiment, the metal may include at least one material selected from a group consisting of lithium, silicon, magnesium, calcium, aluminum, germanium, tin, lead, arsenic, antimony, bismuth, silver, gold, zinc, cadmium, mercury, copper, iron, nickel, cobalt, and indium.

According to an embodiment, the carbon-containing material may include at least one material selected from a group consisting of graphite, graphite carbon fiber, coke, Mesocarbon Microbeads (MCMBS), polyacene, pitch-derived carbon fiber, and hard carbon.

According to an embodiment, the metal oxide may include at least one material selected from a group consisting of lithium titanium oxides, titanium oxides, molybdenum oxides, niobium oxides, iron oxides, tungsten oxides, tin oxides, amorphous tin oxide composites, silicon monoxide, cobalt oxides, and nickel oxides.

According to an embodiment, in addition to the anode active material, a binder and a carbon additive may be further applied to the surface of the anode substrate. The binder and the carbon additive may be the same as or similar to the binder and carbon additive applied to the cathode substrate.

According to an embodiment, the anode tab 123 may be attached to one end of the anode substrate. For example, the anode tab 123 may be disposed to one end in longitudinal direction. One end of the anode substrate to which the anode tab 123 is attached may be disposed adjacent to a starting point where the electrode assembly 100 starts to be wound. For example, one end of the anode substrate to which the anode tab 123 is attached may be disposed adjacent to the central region 101. A plurality of anode tabs 123 may be included as the anode tab 123, and the plurality of anode tabs 123 may be disposed to be spaced apart from each other in the longitudinal direction of the anode substrate.

According to an embodiment, the separator 116 may be disposed between the cathode substrate and the anode substrate to insulate the cathode substrate and the anode substrate from each other. For example, the separator 116 may be constructed of a porous polymer membrane such as polyethylene or polypropylene membrane.

Figure 2B:
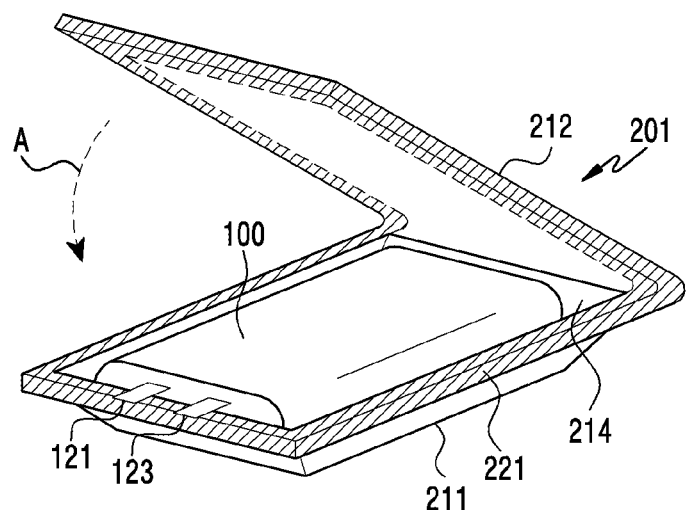
FIG. 2B is a diagram illustrating an electrode assembly accommodated in a pouch according to various embodiments.

FIG. 2A is a diagram illustrating an electrode assembly 100 and a pouch 201 according to various embodiments, and FIG. 2B is a diagram illustrating the electrode assembly 100 accommodated in the pouch 201 according to various embodiments.

Referring to FIG. 2A and FIG. 2B, the electrode assembly 100 may be accommodated in the pouch 201 corresponding to a case of the electrode assembly 100. The electrode assembly 100 may be accommodated in an inner region 214 of the pouch 201 by being moved in a direction indicated by an arrow.

According to an embodiment, the pouch 201 includes the inner region 214 capable of accommodating the electrode assembly 100, and may include one face 211 (e.g., a front face of the pouch 201) including a bonding portion 221 and the other face 212 (e.g., a rear face of the pouch 201) with respect to the inner region 214.

Referring to FIG. 2B, the electrode assembly 100 may be accommodated in the inner region 214 of the pouch 201 in such a manner that the bonding portion 221 included in the one face 211 of the pouch 201 is in contact with the bonding portion 221 included in the other face 212.

Figure 2C:
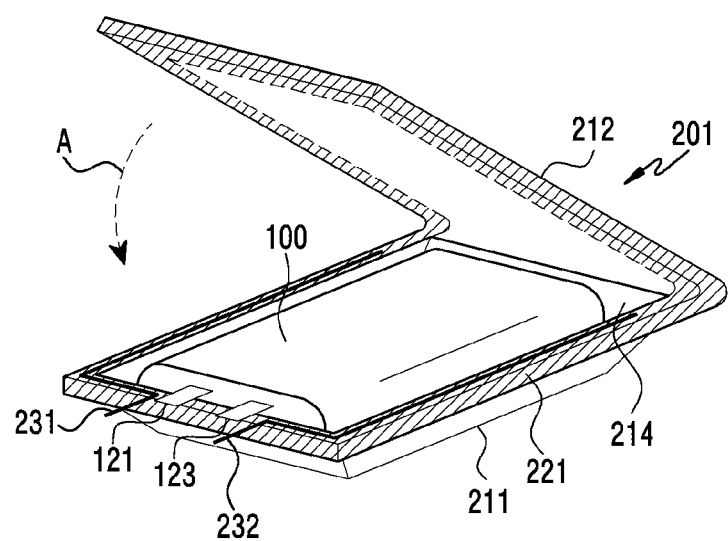
FIG. 2C is a diagram illustrating a damage detection circuit disposed to a bonding portion of a pouch according to various embodiments.

FIG. 2C is a diagram illustrating damage detection circuits 231 and 232 disposed to the bonding portion 221 of the pouch 201 according to various embodiments.

Referring to FIG. 2C, in the pouch 201, a damage detection circuit (e.g., the first damage detection circuit 231 and/or the second damage detection circuit 232) for detecting damage to the battery may be disposed to the bonding portion 221. The damage detection circuit may be constructed integrally with the bonding portion 221 while being included inside the bonding portion 221. For example, in a state in which the damage detection circuit is placed on the bonding portion 221 included in one face 211, the other face 212 may move in a direction A indicated by an arrow so that the damage detection circuit is constructed integrally with the bonding portion 221 while the bonding portion 221 included in the other face 212 is in contact with the bonding portion 221 included in one face 211. For example, the damage detection circuit (e.g., the first damage detection circuit 231 and/or the second damage detection circuit 232) may be disposed by being stacked between one face 211 and the other face 212 of the bonding portion 221 of the pouch 201.

According to an embodiment, the damage detection circuit (e.g., the first damage detection circuit 231 and/or the second damage detection circuit 232) may include a conductive material (e.g., lithium, silicon, magnesium, calcium, aluminum, germanium, tin, lead, arsenic, antimony, bismuth, silver, gold, zinc, cadmium, mercury, copper, iron, nickel, cobalt, indium, sliver, and/or carbon). For example, the damage detection circuit (e.g., the first damage detection circuit 231 and/or the second damage detection circuit 232) may include a wiring constructed of copper.

Figure 3:
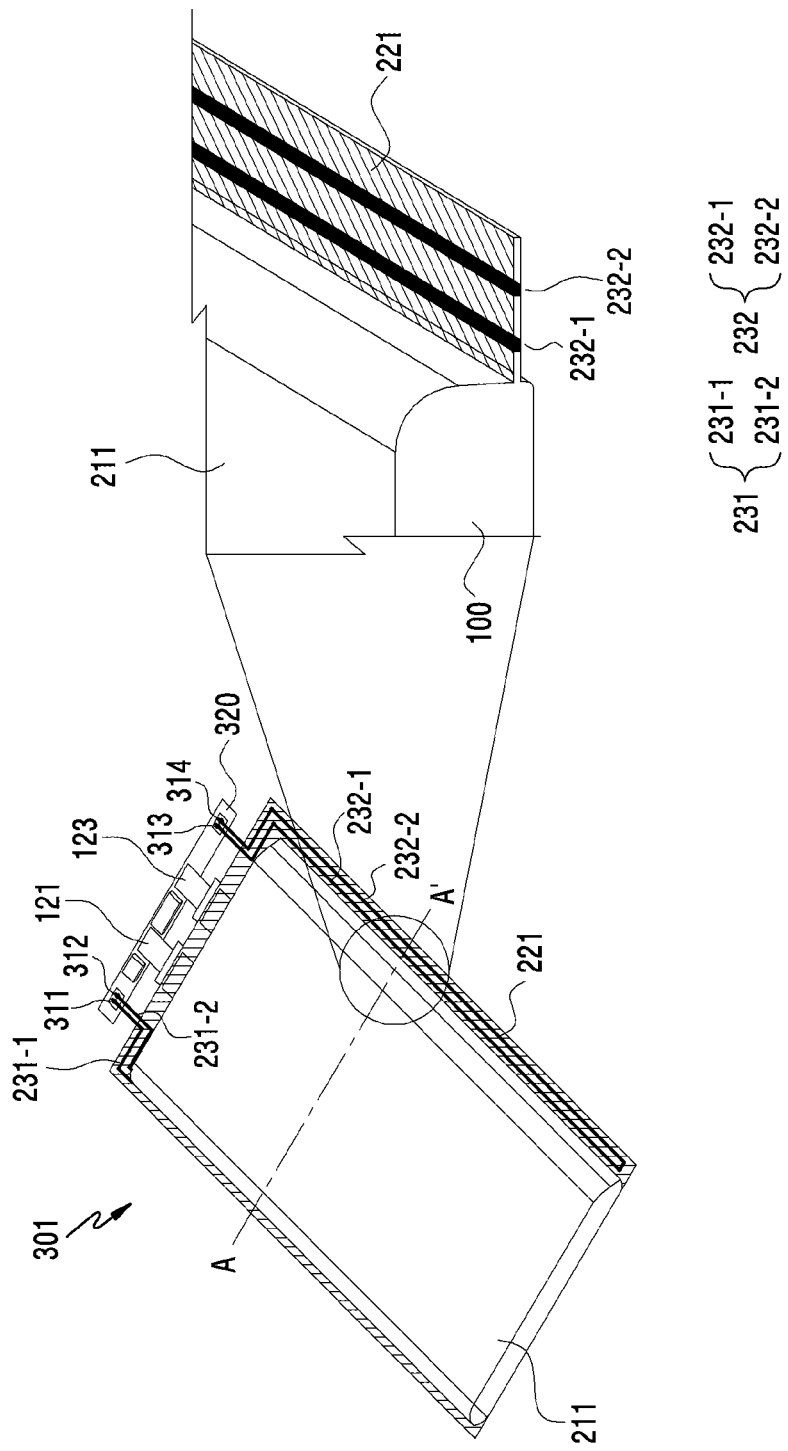
FIG. 3 is a diagram illustrating a damage detection circuit disposed inside a bonding portion of a pouch according to various embodiments.

FIG. 3 is a diagram illustrating damage detection circuits 231 and 232 disposed inside a bonding portion 221 of a pouch 201 according to various embodiments.

FIG. 3 illustrates a battery including an electrode assembly 100 accommodated in the pouch 201, viewed in a direction facing one face 211 of the pouch 201. FIG. 3 includes a partially enlarged view of the battery, taken along the line A-A'.

Referring to FIG. 3, an electronic device 301 may include the electrode assembly 100, the pouch 201, a cathode tab 121, an anode tab 123, a damage detection circuit (e.g., the first damage detection circuit 231, the second damage detection circuit 232), and a circuit board 320. The circuit board 320 may be electrically coupled with the cathode tab 121, the anode table 123, and the damage detection circuit.

According to an embodiment, the first damage detection circuit 231 may extend from a first point 311 of the circuit board 320 in a first direction parallel to a longitudinal direction of the electronic device 301 along the inside of the bonding portion 221 of the pouch 210 and extend in a second direction opposite to the first direction so as to be coupled to a second point 312 of the circuit board 320. For example, the first damage detection circuit 231 may include a first wiring 231-1 of the first damage direction circuit 231 extending in the first direction along the inside of the bonding portion 221 and a second wiring 231-2 of the first damage detection circuit 231 extending in the second direction along the inside of the bonding portion 221.

According to an embodiment, the second damage detection circuit 232 may extend from a third point 313 of the circuit board 320 in the first direction along the inside of the bonding portion 221 of the pouch 210, and extend in the second direction opposite to the first direction so as to be coupled to a fourth point 314 of the circuit board 320. For example, the second damage detection circuit 232 may include a third wiring 232-1 of the second damage direction circuit 232 extending in the first direction along the inside of the bonding portion 221 and a fourth wiring 232-2 of the second damage detection circuit 232 extending in the second direction along the inside of the bonding portion 221.

Figure 4B:
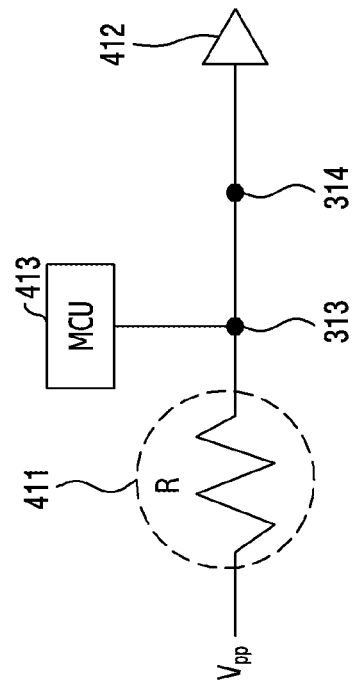
FIGS. 4A and 4B are diagrams illustrating a damage detection circuit and a control circuit according to various embodiments.
Figure 4A:
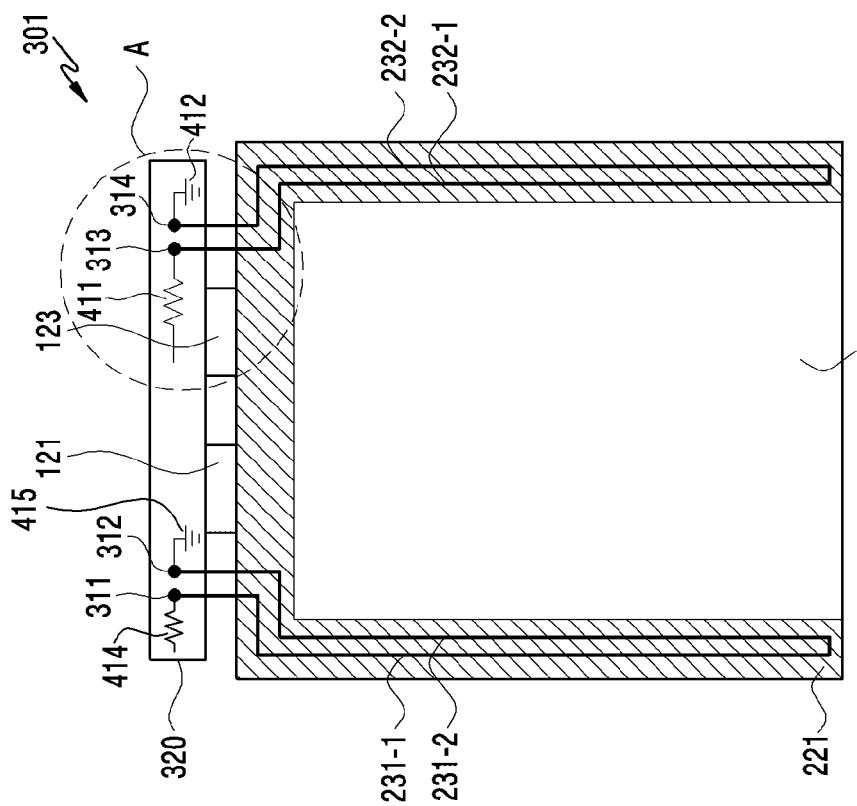

FIGS. 4A and 4B are diagrams illustrating damage detection circuits 231 and 232 and a control circuit according to various embodiments.

FIG. 4A illustrates an electronic device 301 including a damage detection circuit (e.g., the first damage detection circuit 231, the second damage detection circuit 232) and a control circuit, and FIG. 4B illustrates a control circuit. Hereinafter, descriptions on the second damage detection circuit 232 may be equally applied to the first damage detection circuit 231, and vice versa.

Referring to FIGS. 4A and 4B, the first damage detection circuit 231 may extend from a first point 311 of the circuit board 320 in a first direction parallel to a longitudinal direction of the electronic device 301 along the inside of a bonding portion 221, and may extend in a second direction opposite to the first direction along the inside of the bonding portion 221 so as to be coupled to a second point 312 of a circuit board 320

According to an embodiment, one end of the first damage detection circuit 231 may be coupled to a resistor 414 and an electrode of a battery through the first point 311 of the circuit board 320, and the other end of the first damage detection circuit 231 may be coupled to a Ground (GND) 415 through the second point 312 of the circuit board 320.

According to an embodiment, one end of the second damage detection circuit 232 may be coupled to a resistor 411 and an electrode of the battery through a third point 313 of the circuit board 320, and the other end of the second damage detection circuit 232 may be coupled to a GND 412 through a fourth point 314 of the circuit board 320.

According to an embodiment, the electrode of the battery may be a cathode 112 or anode 113 of an electrode assembly (e.g., the electrode assembly 100 of FIG. 1). For example, one end of the first damage detection circuit 231 may be coupled to the resistor 414 and the cathode 112 or anode 114 of the electrode assembly (e.g., the electrode assembly 100) through the first point 311 of the circuit board 320. As another example, one end of the second damage detection circuit 232 may be coupled to the resistor 411 and the cathode 112 or anode 114 of the electrode assembly (e.g., the electrode assembly 100) through the third point 313 of the circuit board 320.

According to an embodiment, the control circuit may be coupled to the second damage detection circuit 232 through the third point 313 of the circuit board 320. Although not shown in FIGS. 4A and 4B, the control circuit may be coupled to the first damage detection circuit 231 through the first point 311 of the circuit board 320. The control circuit may include an Application Processor (AP). The control circuit may include a Micro Controller Unit (MCU) 413, the resistor 411, and the GND 412. The control circuit may measure a voltage value through the second damage detection circuit 232. For example, in a state in which a bonding portion of the pouch 201 is not damaged, the control circuit may measure a first voltage value through the second damage detection circuit 232 coupled to the GND 412. When the bonding portion of the pouch 201 is released and damaged, the second damage detection circuit 232 may be disconnected by reacting with air and electrolyte. When the second damage detection circuit 232 is disconnected, the control circuit may measure a second voltage value of the electrode of the battery coupled through the resistor 411. The second voltage value may be greater than the first voltage value. In response to measuring of the second voltage value, the control circuit may generate a signal indicating a state in which the bonding portion 221 of the pouch 201 is released and damaged. The control circuit may provide the generated signal to a processor of the electronic device 301.

According to an embodiment, when the control circuit detects a state in which the bonding portion 221 of the pouch 201 is released and damaged using a damage detection circuit (e.g., the first damage detection circuit 231, the second damage detection circuit 232), the electronic device 301 (e.g., smartphone) may provide a notification corresponding to a state in which the bonding portion 221 of the pouch 201 is damaged. For example, the notification may include an operation of displaying a screen displaying content corresponding to the damaged state through a display or outputting content corresponding to the damaged state through a speaker.

According to an embodiment, when the control circuit detects the state in which the bonding portion 221 of the pouch 201 is released and damaged using the damage detection circuit, the electronic device 301 may stop battery charging.

Figure 9:
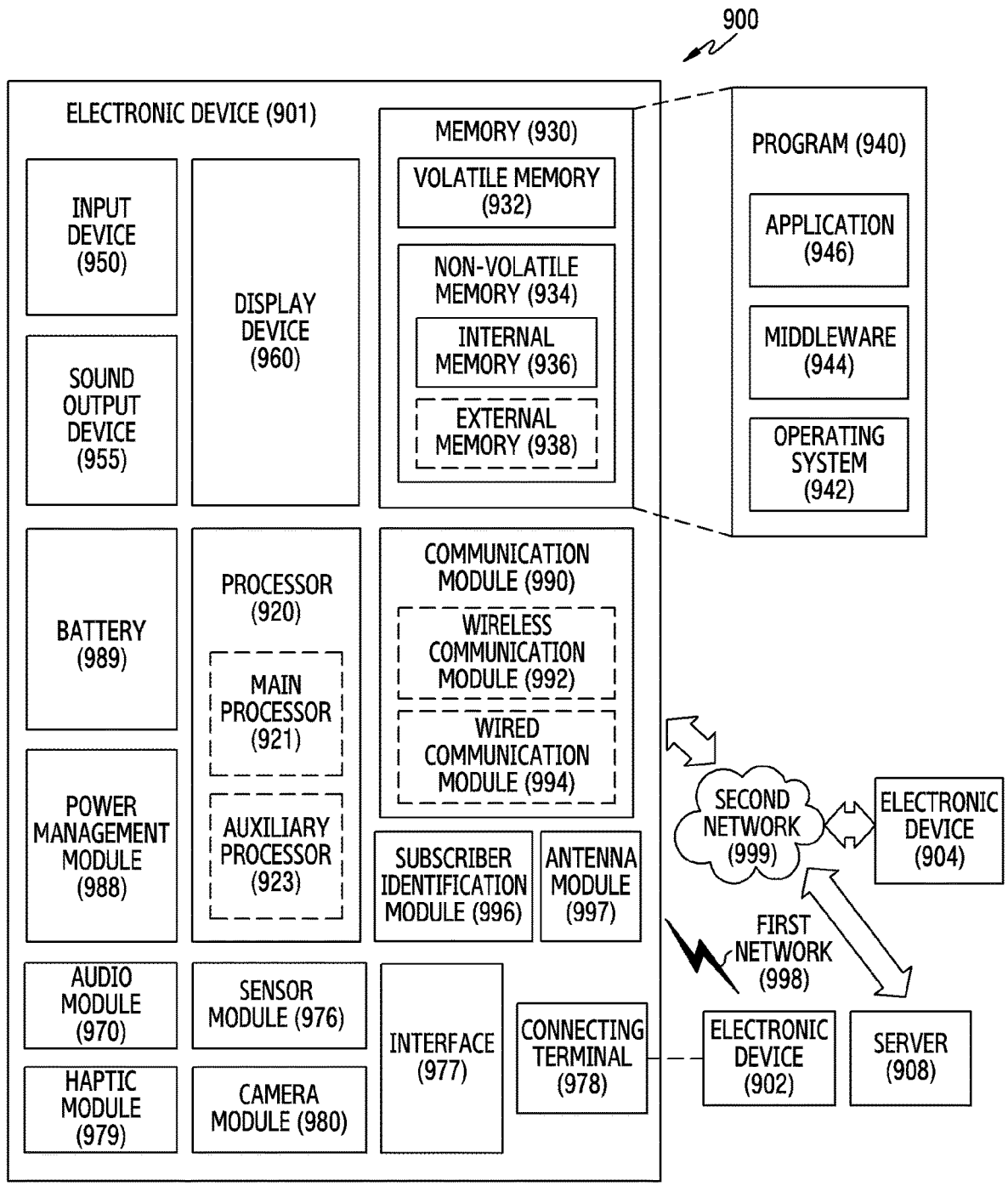
FIG. 9 is a block diagram illustrating an example electronic device in a network environment according to various embodiments.

According to an embodiment, the MCU 413 may include, for example, and without limitation, an auxiliary processor (e.g., an auxiliary processor 923 of FIG. 9).

According to an embodiment, the control circuit may identify whether a voltage value measured through the second damage detection circuit 232 changes by more than a reference value. When the measured voltage value changes by more than the reference value, the control circuit may generate a signal related to damage to the battery. The control circuit may provide the generated signal to the processor of the electronic device 301.

Figure 5A:
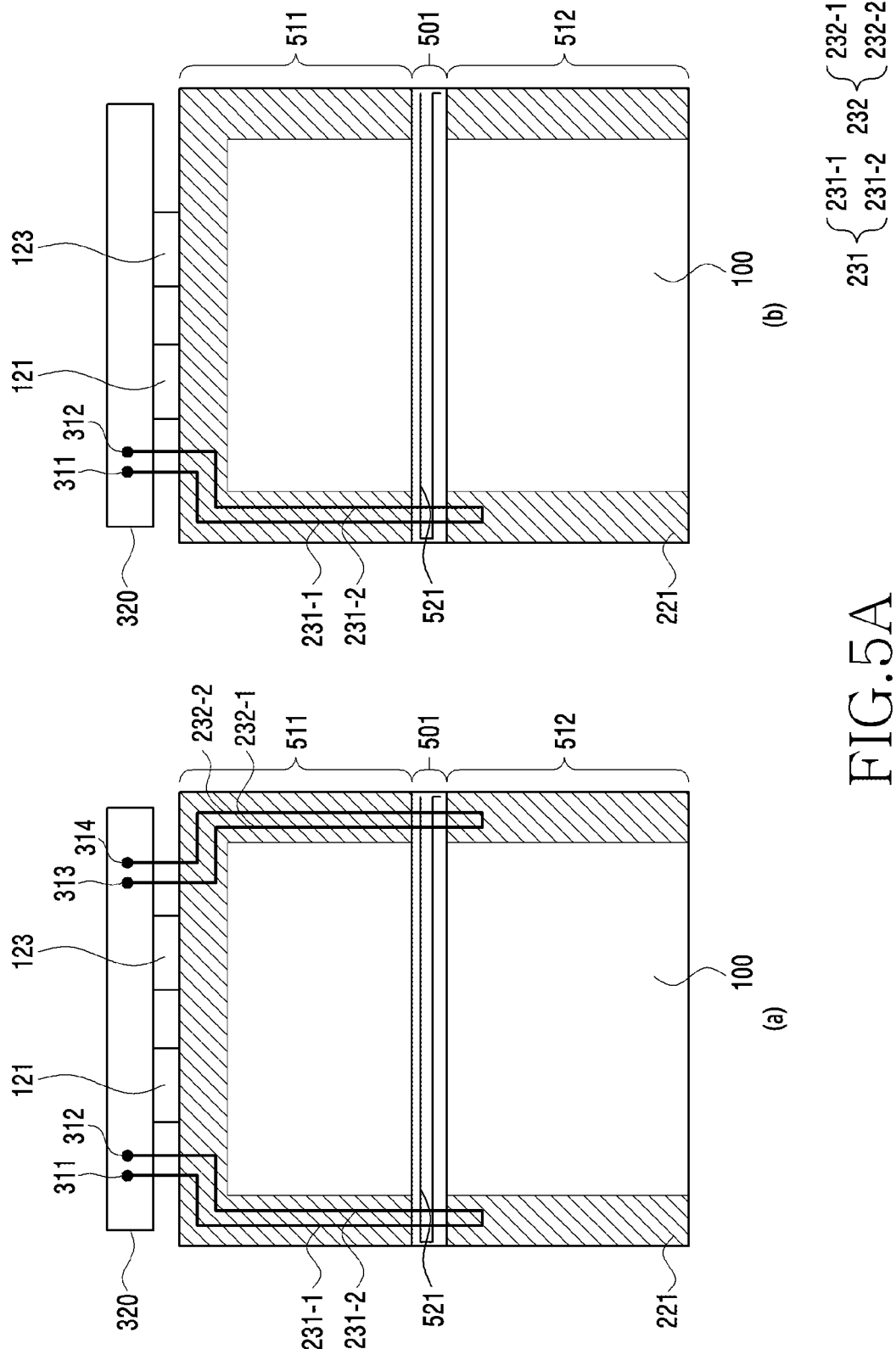
FIG. 5A is a diagram illustrating a damage detection circuit included in a flexible battery having one folding portion in a horizontal direction according to various embodiments.
Figure 5B:
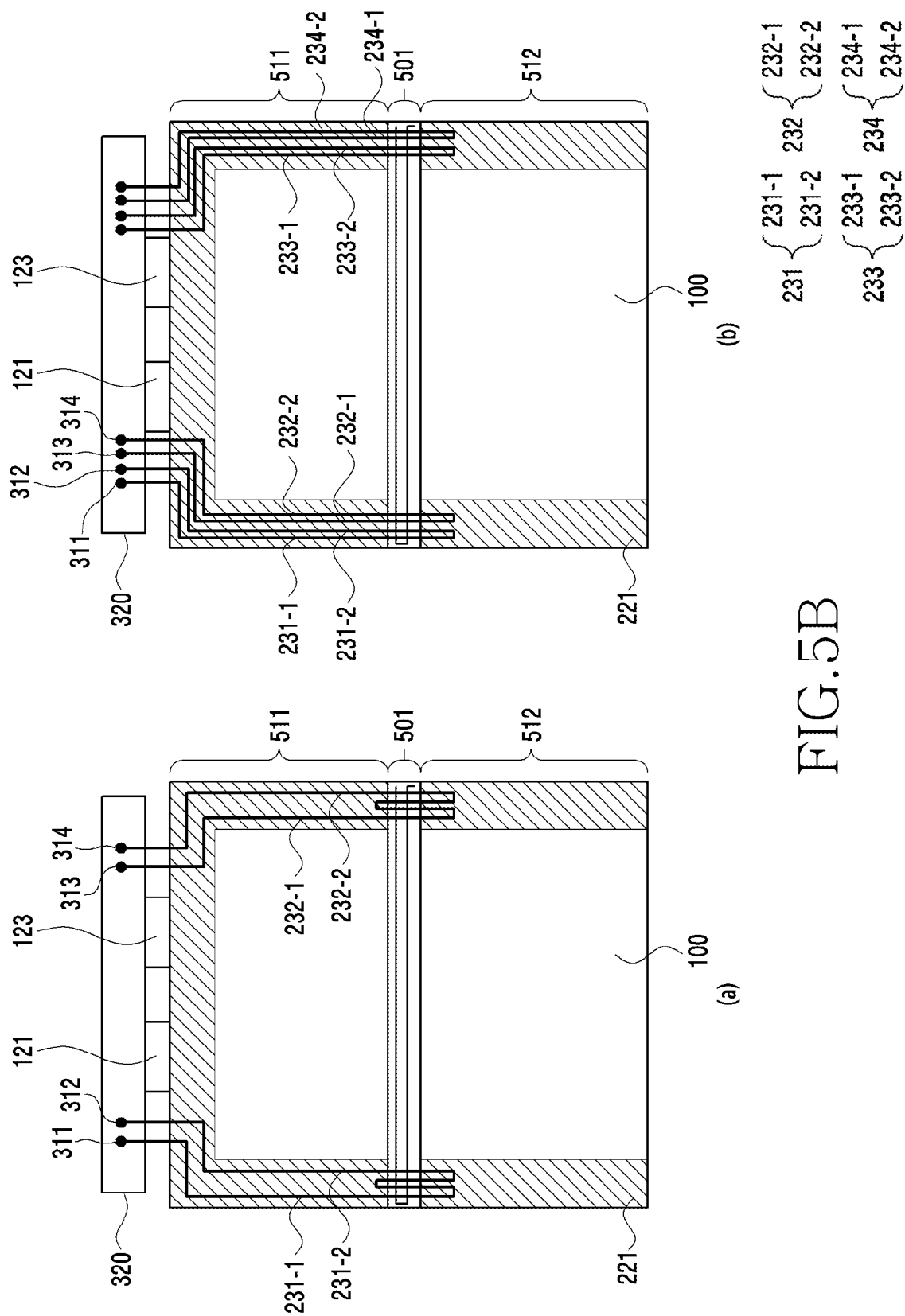
FIG. 5B is a diagram illustrating a damage detection circuit included in a flexible battery having one folding portion in a horizontal direction according to various embodiments.

FIG. 5A and FIG. 5B are diagrams illustrating damage detection circuits 231 and 232 included in a flexible battery having one folding portion 501 in a horizontal direction according to various embodiments.

FIG. 5A (a) illustrates two damage detection circuits (e.g., the first damage detection circuit 231, the second damage detection circuit 232) included along the inside of a bonding portion 221 of a pouch 201 of the flexible battery.

According to an embodiment, the first damage detecting circuit 231 may be disposed along the inside of the bonding portion 221 located in a first direction (e.g., a left direction) with respect to a central axis of the flexible battery having the folding portion 501, and the second damage detection circuit 232 may be disposed along the inside of the bonding portion 221 located in a second direction (e.g., a right direction) opposite to the first direction. The central axis may imply a virtual line passing through a center of the flexible battery and perpendicular to the folding portion 501.

According to an embodiment, the folding portion 501 may have a folding axis 521 constructed when a first portion 511 and a second portion 512 are folded with a specific angle. According to an embodiment, the first damage detection circuit 231 may extend from a first point 311 of a circuit board 320 to the inside of the bonding portion 221 located in the first portion 511, and may include a first wiring 231-1 of the first damage detection circuit 231 extending to the second portion 512 by crossing the first portion 511 and the folding portion 501 along the inside of the bonding portion 221 and a second wiring 231-2 of the first damage detection circuit 231 extending from the second portion 512 to the second point 312 of the circuit board 320 by crossing the folding portion 501 and the first portion 511.

According to an embodiment, the second damage detection circuit 232 may extend from a third point 313 of the circuit board 320 to the inside of the bonding portion 221 located in the first portion 511, and may include a third wiring 232-1 of the first damage detection circuit 232 extending to the second portion 512 by crossing the first portion 511 and the folding portion 501 along the inside of the bonding portion 221 and a fourth wiring 232-2 of the second damage detection circuit 232 extending from the second portion 512 to a fourth point 314 of the circuit board 320 by crossing the folding portion 501 and the first portion 511.

FIG. 5A (b) illustrates one damage detection circuit (e.g., the first damage detection circuit 231) disposed along the inside of the bonding portion 221 of the pouch 201 of the flexible battery. FIG. 5A (a) and (b) may be identical or similar except that the number of damage detection circuits may be different. Part of the content described with reference to FIG. 5A (a) may equally apply to the first damage detection circuit 231 illustrated in FIG. 5A (b). Although FIG. 5A (b) illustrates the first damage detection circuit 231 disposed along the inside of the bonding portion 221 located in a first direction (e.g., a left direction), the disclosure is not limited thereto, and thus it may be disposed along the inside of the bonding portion 221 located in a second direction (e.g., a right direction).

FIG. 5B (a) illustrates the damage detection circuit (e.g., the first damage detection circuit 231, the second damage detection circuit 232) disposed along the inside of the bonding portion 221 of the pouch 201 of the flexible battery.

According to an embodiment, the first damage detection circuit 231 may extend from the first point 311 of the circuit board 320 to the inside of the bonding portion 221 of the first portion 511, extend to the second portion 512 by crossing the first portion 511 and the folding portion 501 along the bonding portion 221, extend from the second portion 512 by crossing the folding portion 501, the first portion 511, and the folding portion 501 in that order to the second portion 512, and may extend from the second portion 512 to the second point 312 of the circuit board 302 by crossing the folding portion 501 and the first portion 511.

According to an embodiment, the second damage detection circuit 232 may be disposed along the inside of the bonding portion 221, so as to be symmetric to the first damage detection circuit 231 illustrated in FIG. 5B (a) with respect to a virtual line (e.g., a central axis) passing through a center point of the flexible battery and perpendicular to the folding portion 501.

According to an embodiment, although not shown in (a) of FIG. 5B, the flexible battery may include only the first damage detection circuit 231 along the inside of the bonding portion 221 located in one direction (e.g., a left direction) from the central axis, or may include only the second damage detection circuit 232 along the inside of the bonding portion 221 located in the other direction (e.g., a right direction) from the central axis.

According to an embodiment, the first damage detection circuit 231 may extend from the first point 311 of the circuit board 320 by crossing the folding portion 501 multiple times, thereby being coupled to the second point 312 of the circuit board 320. The first damage detection circuit 231 may be included inside the bonding portion 221 disposed in one side (e.g., a left side) of the flexible battery, and may multiple times extend from the first portion 511 to the second portion 512 by crossing the folding portion 501 or extend from the second portion 512 to the first portion 511 by crossing the folding portion 501. For example, it is shown in (a) of FIG. 5B that the first damage detection circuit 231 extends from the first portion 511 to the second portion 512 by crossing the folding portion 501, extends from the second portion 512 to the first portion 511 by crossing the first portion 511, extends from the first portion 511 to the second portion 512 by crossing the folding portion 501, and extends from the second portion 512 to the first portion 511 by crossing the folding portion 501. That is, the first damage detection circuit 231 extends four times by crossing the folding portion 501.

FIG. 5B (b) illustrates that the first damage detection circuit 231 and the second damage detection circuit 232 are disposed along the inside of the bonding portion 221 disposed in the first direction (e.g., the left direction) with respect to the central axis of the flexible battery, and a third damage detection circuit 233 and a fourth damage detection circuit 234 are disposed along the inside of the bonding portion 221 disposed in the second direction (e.g., the right direction) opposite to the first direction with respect to the central axis.

According to an embodiment, the first damage detection circuit 231 may extend from the first point 311 of the circuit board 320 to the inside of the bonding portion 221 located in the first portion 511, and may include the first wiring 231-1 of the first damage detection circuit 231 extending to the second portion 512 by crossing the first portion 511 and the folding portion 501 along the inside of the bonding portion 221 and the second wiring 231-2 of the first damage detection circuit 231 extending from the second portion 512 to the second point 312 of the circuit board 320 by crossing the folding portion 501 and the first portion 511.

According to an embodiment, the second damage detection circuit 232 extends from the third point 313 of the circuit board 320 to the inside of the bonding portion 221 located in the first portion 511, and may include the third wiring 232-1 of the first damage detection circuit 232 extending to the second portion 512 by crossing the first portion 411 and the folding portion 501 along the inside of the bonding portion 221 and the fourth wiring 232-2 of the second damage detection circuit 232 extending from the second portion 512 to the fourth point 314 of the circuit board 320 by crossing the folding portion 501 and the first portion 511.

According to an embodiment, the third damage detection circuit 233 and the fourth damage detection circuit 234 may be disposed along the inside of the bonding portion 221, so as to be symmetric to the first damage detection circuit 231 and second damage detection circuit 232 illustrated in (b) of FIG. 5B with respect to a virtual line (e.g., a central axis) passing through a center point of the flexible battery and perpendicular to the folding portion 501.

According to an embodiment, although not shown in (b) of FIG. 5B, the flexible battery may include only the first damage detection circuit 231 and the second damage detection circuit 232 along the inside of the bonding portion 221 located in one direction (e.g., the left direction) with respect to the central axis, or may include only the third damage detection circuit 233 and the fourth damage detection circuit 234 along the inside of the bonding portion 221 located in the other direction (e.g., the right direction) from the central axis.

FIGS. 6A and 6B are diagrams illustrating damage detection circuits 231 and 232 included in a flexible battery having two folding portions 601 and 602 in a horizontal direction according to various embodiments.

FIG. 6A illustrates the first damage detection circuit 231 disposed along the inside of a bonding portion 221 of a pouch 201 disposed in a first direction (e.g., a left direction) of the flexible battery including the first folding portion 601 and the second folding portion 602.

FIG. 6B illustrates the first damage detection circuit 231 disposed along the inside of the bonding portion 221 disposed in a first direction (e.g., a left direction) of the flexible battery including the first folding portion 601 and second folding portion 602, and the second damage detection circuit 232 disposed along the inside of the bonding portion 221 disposed in a second direction (e.g., a right direction) opposite to the first direction.

Referring to FIG. 6A, the first damage detection circuit 231 may extend from a first point 311 of a circuit board 320 up to a third portion 613 by crossing a first portion 611, the first folding portion 601, a second portion 612, and the second folding portion 602 along the inside of the bonding portion 221, and may extend from the third portion 613 up to a second point 312 of the circuit board 320 by crossing the second folding portion 602, the second portion 612, the first folding portion 601, and the first folding portion 601.

According to an embodiment, the first damage detection circuit 231 may include the first wiring 231-1 extending up to the third portion 612 by crossing the first portion 611, the first folding portion 601, the second portion 612, and the second folding portion 602 in that order, and the second wiring 231-2 extending up to the first portion 611 by crossing the third portion 613, the second folding portion 602, the second portion 612, and the first folding portion 601 in that order.

Referring to FIG. 6B, the first damage detection circuit 231 may extend from the first point 311 of the circuit board 320 up to the second portion 612 by crossing the first portion 611 and the first folding portion 601 along the inside of the bonding portion 221, and may extend from the second portion 612 up to the second point 312 of the circuit board 320 by crossing the first folding portion 601 and the first portion 611. The description on the first damage detection circuit 231 illustrated in (a) of FIG. 5B may be equally applied to the first damage detection circuit 231 illustrated in FIG. 6B.

According to an embodiment, the description on the first damage detection circuit 231 illustrated in FIG. 6A may be substantially applied to the second damage detection circuit 232 illustrated in the FIG. 6B due to a symmetry feature, except for a difference based on a location in which the damage detection circuit is disposed.

Figure 7A:
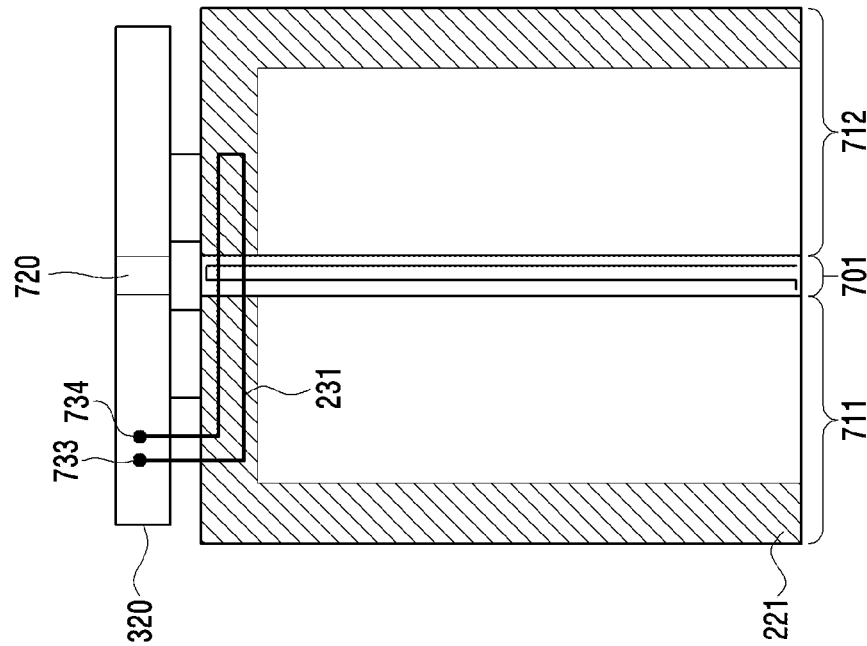
FIGS. 7A and 7B are diagrams illustrating a damage detection circuit included in a flexible battery having one folding portion in a vertical direction according to various embodiments.
Figure 7B:
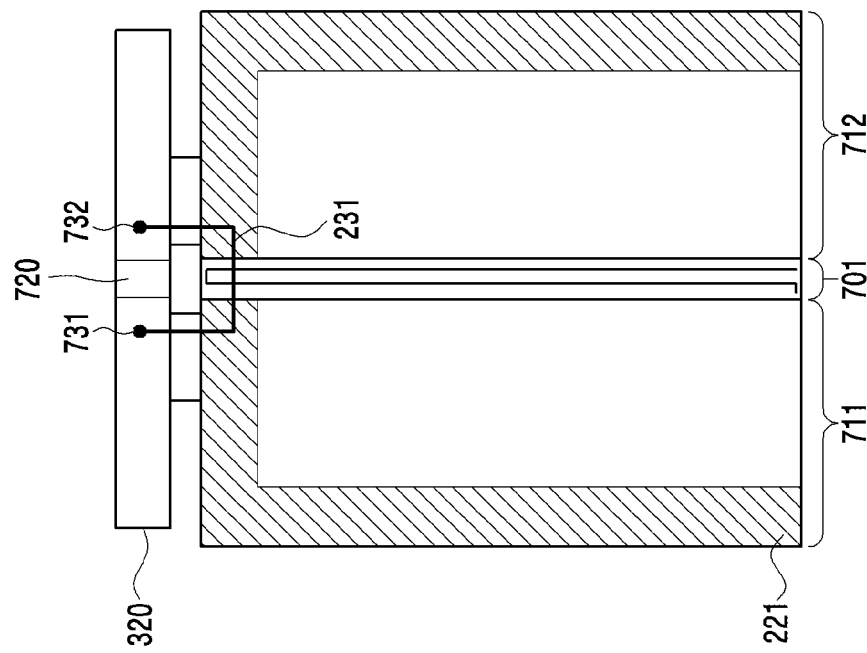

FIGS. 7A and 7B are diagrams illustrating a damage detection circuit 231 included in a flexible battery having one folding portion 701 in a vertical direction according to various embodiments.

Referring to FIG. 7, the flexible battery includes the folding portion 701 of a vertical direction. A flexible battery disposed in a first direction (e.g., a left direction) with respect to the folding portion 701 may be referred to as a first portion 711, and a flexible battery disposed in a second direction (e.g., a right direction) opposite to the first direction may be referred to as a second portion 712. The flexible battery may be bent through the folding portion 701 with a specific angle constructed by the folding portion 711 and the second portion 712.

According to an embodiment, a circuit board 320 may include a Flexible Printed Circuit Board (FPCB) 720. The circuit board 320 may include the FPCB 720 at an intersection of the circuit board 320 and a virtual line extending in a folding axis direction from the folding portion 710.

Referring to FIG. 7A, the first damage detection circuit 231 may extend from a first point 731 of the circuit board 320 to the inside of a bonding portion 221 of the first portion 711, extend up to the second portion 712 by crossing the first portion 711, the folding portion 701 along the inside of the bonding portion 221, and may extend from the second portion 712 to a second point 732 of the circuit board 302. The first point 731 of the circuit board 320 may be disposed in the first direction with respect to the FPCB 720, and the second point 732 of the circuit board 320 may be disposed in the second direction with respect to the FPCB 720.

Referring to FIG. 7B, the first damage detection circuit 231 may extend from a third point 733 of the circuit board 320 to the inside of the bonding portion 221 disposed to the first portion 711, extend up to the second portion 712 by crossing the first portion 711 and the folding portion 701 along the inside of the bonding portion 221, and extend from the second portion 712 up to a fourth point 734 of the circuit board 320 by crossing the folding portion 701 and the first portion 711 along the bonding portion 221. The third portion 733 and fourth portion 734 of the circuit board 320 may be disposed in the first direction with respect to the FPCB 720. Although not shown in FIG. 7B, the third point 733 and the fourth point 734 may be disposed in the second direction with respect to the FPCB 720. For example, the first damage detection circuit may extend along the inside of the bonding portion 221 by crossing the second portion 712, the folding portion 701, the first portion 711, the folding portion 701, and the second portion 712 in that order.

FIG. 8 is a diagram illustrating an exterior of a flexible battery according to various embodiments.

(a) and (b) of FIG. 8 illustrate a first damage detection circuit 831 and a second damage detection circuit 832, which are disposed inside a bonding portion 221 by extending from a circuit board 320. The electronic device 301 may include the flexible battery, the circuit board 320, and an FPCB 821. The flexible battery may include a first portion 811, a second portion 812, and a folding portion 801 in which the first portion 811 and the second portion 812 can be folded with a specific angle.

Referring to (a) of FIG. 8, the FPCB 821 may couple the circuit board 320 and the electronic device 301. The electronic device 301 may obtain power from the flexible battery through the FPCB 821.

Referring to (b) of FIG. 8, an anode tab 123 of the flexible battery may be coupled to the circuit board 320. The damage detection circuit may extend from a first point 831 of the circuit board 320 to the inside of the bonding portion 221, and may extend to the second portion 812 by crossing the first portion 811 and the folding portion 801 along the inside of the bonding portion 221. The damage detection circuit may extend from the second portion 812 to second portion 812 of the circuit board 320 by crossing the folding portion 801 and the first portion 811. One face of the bonding portion 221 may be in contact with a side face of the flexible battery.

According to an example embodiment, the electronic device may include a battery. The battery may include the electrode assembly including a cathode substrate coupled to a cathode tab, the anode substrate coupled to an anode tab, and the separator sheet disposed between the cathode substrate and the anode substrate, and a pouch accommodating the electrode assembly. The pouch may include a bonding portion provided along an edge of the electrode assembly.

According to an example embodiment, the electronic device may include a first damage detection circuit configured to detect damage to the battery, and a circuit board to which the cathode tab, the anode tab, and the first damage detection circuit are electrically coupled.

According to an example embodiment, the battery may include a first portion, a second portion foldable with respect to the first portion, and a folding portion coupling the first portion and the second portion. The first damage detection circuit may extend from a first point of the circuit board to a single point of the second portion by crossing the first portion and the folding portion along an inside of the bonding portion, and extend from the single point up to a second point of the circuit board by crossing the folding portion and the first portion along the inside of the bonding portion.

According to an example embodiment, the first damage detection circuit may extend up to the second point of the circuit board by crossing the folding portion multiple times along the inside of the bonding portion.

According to an example embodiment, the first damage detection circuit may be integral with the bonding portion.

According to an example embodiment, the bonding portion of the pouch may include a first region located in a first direction with respect to a virtual line passing a center of the battery and perpendicular to a folding axis of the folding portion, and a second region located in a second direction opposite to the first direction with respect to the virtual line. The first damage detection circuit may be disposed to the first region.

According to an example embodiment, the electronic device may further include a second damage detection circuit. The first damage detection circuit may be disposed to the first region, and the second damage detection circuit may be disposed to the second region.

According to an example embodiment, the second damage detection circuit may extend from a third point of the circuit board up to a single point of the second portion by crossing the first portion and the folding portion along the inside of the bonding portion, and extend from the single point of the second portion up to the fourth point of the circuit board by crossing the folding portion and the first portion along the inside of the bonding portion.

According to an example embodiment, the electronic device may further include a second damage detection circuit. The second damage detection circuit may be disposed to the first region to which the first damage detection circuit is disposed.

According to an embodiment, one end of the first damage detection circuit may be coupled to an electrode of the battery through the first point of the circuit board, and the other end of the first damage detection circuit may be coupled to a ground through the second point of the circuit board.

According to an example embodiment, the electronic device may further include at least one control circuit coupled to the circuit board. The at least one control circuit may be configured to measure a voltage value through the first damage detection circuit, identify whether the measured voltage value changes by at least a reference value, and generate a signal related to damage to the battery if the measured voltage value changes by at least the reference value.

According to an example embodiment, the at least one control circuit may be electrically coupled to the first damage detection circuit through the first point of the circuit board.

According to an example embodiment, a folding axis of the folding portion may be perpendicular to directions of the cathode tab and direction of the anode tab, which face the circuit board.

According to an example embodiment, the electronic device may include a battery. The battery may include: an electrode assembly including a cathode substrate coupled to a cathode tab, an anode substrate coupled to an anode tab, and a separator sheet disposed between the cathode substrate and the anode substrate, and a pouch accommodating the electrode assembly. The pouch may include a bonding portion a provided along an edge of the electrode assembly.

According to an example embodiment, the electronic device may include a first damage detection circuit configured to detect damage to the battery, and a circuit board to which the cathode tab, the anode tab, and the first damage detection circuit are electrically coupled.

According to an example embodiment, the electronic device may include a flexible printed circuit board (FPCB) disposed between the circuit board coupled to the cathode tab and the circuit board coupled to the anode tab.

According to an example embodiment, the battery may include a first portion, a second portion foldable with respect to the first portion, and a folding portion coupling the first portion and the second portion.

According to an example embodiment, a direction of a folding axis of the folding portion may be parallel to directions of the cathode tab and anode tab, which face the circuit board.

According to an example embodiment, the bonding portion of the pouch may include a first region located in a first direction with respect to the folding axis of the folding portion and a second region located in a second direction opposite to the first direction with respect to the folding axis. The first damage detection circuit may be disposed along the inside of the bonding portion.

According to an example embodiment, the first damage detection circuit may extend from a first point of the circuit board up to a second portion by crossing the first portion and a folding portion along the inside of the bonding portion, and extend from the second portion up to a second point of the circuit board. According to an example embodiment, the first damage detection circuit may extend from the first point of the circuit board up to a single point of the second portion by crossing the first portion and the folding portion along the inside of the bonding portion, and extend from the single point of the second portion up to the second point of the circuit board by crossing the folding portion and the first portion along the inside of the bonding portion.

According to an example embodiment, the first damage detection circuit may be integral with the bonding portion.

According to an example embodiment, the battery may include the electrode assembly including a cathode substrate coupled to the cathode tab, an anode substrate coupled to the anode tab, and a separator sheet disposed between the cathode substrate and the anode substrate, and a pouch accommodating the electrode assembly. The pouch may include a bonding portion constructed along an edge of the electrode assembly.

According to an example embodiment, the electronic device may include a first damage detection circuit configured to detect damage to the battery, and the circuit board to which the cathode tab, the anode tab, and the first damage detection circuit are electrically coupled. The first damage detection circuit may be coupled to the second point of the circuit board by extending in a first direction parallel to a longitudinal direction of the battery along the inside of the bonding portion from the first point of the circuit board and by extending in a second direction opposite to the first direction.

According to an example embodiment, the first damage detection circuit may be integral with the bonding portion.

According to an example embodiment, one end of the first damage detection circuit may be coupled to an electrode of the battery through the first point of the circuit board, and the other end of the first damage detection circuit is coupled to a ground through the second point of the circuit board.

According to an example embodiment, the electronic device may further include at least one control circuit coupled to the circuit board. The at least one control circuit may be configured to measure a voltage value through the first damage detection circuit, identify whether the measured voltage value changes by at least a reference value, and generate a signal related to damage to the battery based on the measured voltage value changing by at least the reference value.

According to an example embodiment, the at least one control circuit may be electrically coupled to the first damage detection circuit through the first point of the circuit board.

FIG. 9 is a block diagram illustrating an example electronic device 901 in a network environment 900 according to various embodiments. Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In various embodiments, at least one of the components (e.g., the connecting terminal 978) may be omitted from the electronic device 901, or one or more other components may be added in the electronic device 901. In various embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to an embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901. The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to an embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element including a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In an embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a battery;
        wherein the battery comprises:
        an electrode assembly comprising a cathode substrate coupled to a cathode tab, an anode substrate coupled to an anode tab, and a separator sheet disposed between the cathode substrate and the anode substrate; and
        a pouch accommodating the electrode assembly, wherein the pouch comprises a bonding portion provided along an edge of the electrode assembly,
    a first damage detection circuit configured to detect damage to the battery; and
    a circuit board to which the cathode tab, the anode tab, and the first damage detection circuit are electrically coupled,
    wherein the battery comprises a first portion, a second portion foldable with respect to the first portion, and a folding portion coupling the first portion and the second portion, and
    wherein the first damage detection circuit extends from a first point of the circuit board to a single point of the second portion by crossing the first portion and the folding portion along an inside of the bonding portion, and extends from the single point of the second portion to a second point of the circuit board by crossing the folding portion and the first portion along the inside of the bonding portion.

2. The electronic device of claim 1, wherein the first damage detection circuit extends up to the second point of the circuit board by crossing the folding portion multiple times along the inside of the bonding portion.

3. The electronic device of claim 1, wherein the first damage detection circuit is integral with the bonding portion.

4. The electronic device of claim 1,
    wherein the bonding portion of the pouch comprises a first region located in a first direction with respect to a virtual line passing a center of the battery and perpendicular to a folding axis of the folding portion, and a second region located in a second direction opposite to the first direction with respect to the virtual line, and
    wherein the first damage detection circuit is disposed to the first region.

5. The electronic device of claim 4, further comprising a second damage detection circuit,
    wherein the first damage detection circuit is disposed to the first region, and the second damage detection circuit is disposed to the second region.

6. The electronic device of claim 5, wherein the second damage detection circuit extends from a third point of the circuit board to a single point of the second portion by crossing the first portion and the folding portion along the inside of the bonding portion, and extends from the single point of the second portion to a fourth point of the circuit board by crossing the folding portion and the first portion along the inside of the bonding portion.

7. The electronic device of claim 4, further comprising a second damage detection circuit,
    wherein the second damage detection circuit is disposed to the first region to which the first damage detection circuit is disposed.

8. The electronic device of claim 1, wherein one end of the first damage detection circuit is coupled to an electrode of the battery through the first point of the circuit board, and another end of the first damage detection circuit is coupled to a ground (GND) through the second point of the circuit board.

9. The electronic device of claim 1, further comprising at least one control circuit coupled to the circuit board,
    wherein the at least one control circuit is configured to:
    measure a voltage value through the first damage detection circuit;
    identify whether the measured voltage value changes by at least a reference value; and
    generate a signal related to damage to the battery based on the measured voltage value changing by at least the reference value.

10. The electronic device of claim 9, wherein the at least one control circuit is electrically coupled to the first damage detection circuit through the first point of the circuit board.

11. The electronic device of claim 1, wherein a folding axis of the folding portion is perpendicular to a direction of the cathode tab and a direction of the anode tab, which face the circuit board.

12. An electronic device comprising:
    a battery;
        wherein the battery comprises:
        an electrode assembly comprising a cathode substrate coupled to a cathode tab, an anode substrate coupled to an anode tab, and a separator sheet disposed between the cathode substrate and the anode substrate; and
        a pouch accommodating the electrode assembly, wherein the pouch comprises a bonding portion provided along an edge of the electrode assembly, a first damage detection circuit configured to detect damage to the battery;
a circuit board to which the cathode tab, the anode tab, and the first damage detection circuit are electrically coupled;
a flexible printed circuit board (FPCB) disposed between the circuit board coupled to the cathode tab and the circuit board coupled to the anode tab;
wherein the battery comprises: a first portion, a second portion foldable with respect to the first portion, and a folding portion coupling the first portion and the second portion, wherein a direction of a folding axis of the folding portion is parallel to directions of the cathode tab and anode tab, which face the circuit board,
wherein the bonding portion of the pouch comprises a first region located in a first direction with respect to the folding axis of the folding portion and a second region located in a second direction opposite to the first direction with respect to the folding axis, and
wherein the first damage detection circuit is disposed along an inside of the bonding portion.

13. The electronic device of claim 12, wherein the first damage detection circuit extends from a first point of the circuit board to the second portion by crossing the first portion and the folding portion along the inside of the bonding portion, and extends from the second portion to a second point of the circuit board.

14. The electronic device of claim 12, wherein the first damage detection circuit extends from a first point of the circuit board to a single point of the second portion by crossing the first portion and the folding portion along the inside of the bonding portion, and extends from the single point of the second portion to a second point of the circuit board by crossing the folding portion and the first portion along the inside of the bonding portion.

15. The electronic device of claim 14, wherein the first damage detection circuit is integral with the bonding portion.

16. An electronic device comprising:
a battery;
wherein the battery comprises:
an electrode assembly comprising a cathode substrate coupled to a cathode tab, an anode substrate coupled to an anode tab, and a separator sheet disposed between the cathode substrate and the anode substrate; and
a pouch accommodating the electrode assembly, wherein the pouch comprises a bonding portion provided along an edge of the electrode assembly,
a first damage detection circuit configured to detect damage to the battery; and
a circuit board to which the cathode tab, the anode tab, and the first damage detection circuit are electrically coupled,
wherein the first damage detection circuit is coupled to a second point of the circuit board by extending in a first direction parallel to a longitudinal direction of the battery along an inside of the bonding portion from a first point of the circuit board and by extending in a second direction opposite to the first direction.

17. The electronic device of claim 16, wherein the first damage detection circuit is integral with the bonding portion.

18. The electronic device of claim 16, wherein one end of the first damage detection circuit is coupled to an electrode of the battery through the first point of the circuit board, and another end of the first damage detection circuit is coupled to a ground (GND) through the second point of the circuit board.

19. The electronic device of claim 16, further comprising at least one control circuit coupled to the circuit board,
wherein the at least one control circuit is configured to:
measure a voltage value through the first damage detection circuit;
identify whether the measured voltage value changes by at least a reference value; and
generate a signal related to damage to the battery based on the measured voltage value changing by at least the reference value.

20. The electronic device of claim 19, wherein the at least one control circuit is electrically coupled to the first damage detection circuit through the first point of the circuit board.

* * * * *